Figure 1:
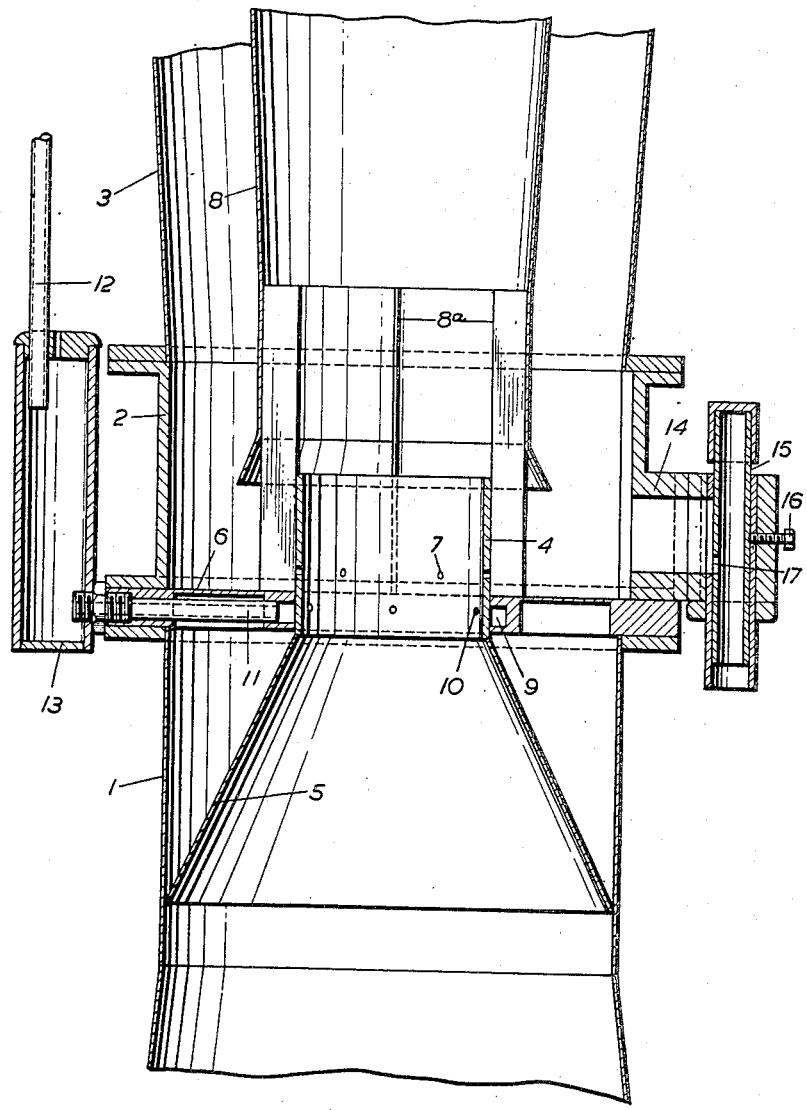

Jan. 26, 1954     B. S. ROBSON     2,667,340
GAS-LIQUID CONTACT APPARATUS

Filed Nov. 27, 1951     3 Sheets-Sheet 1

Inventor
B. S. Robson
By
Webb Racker+Burder
Attorney

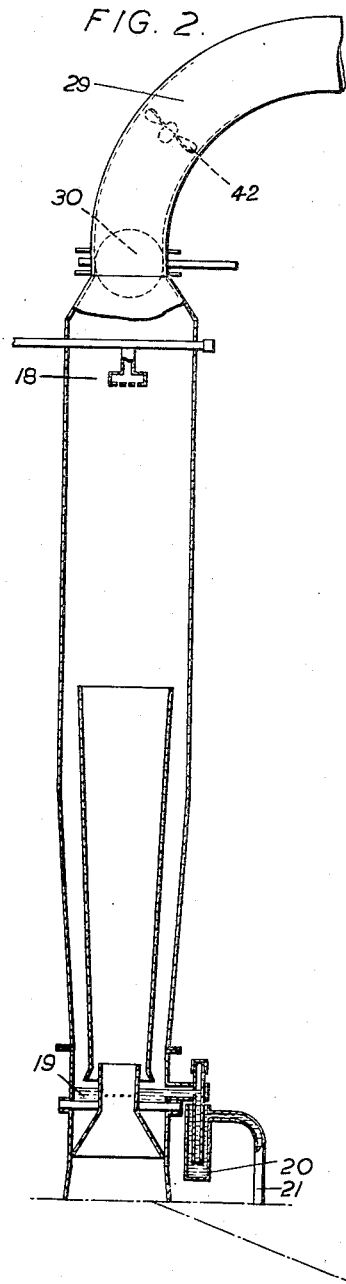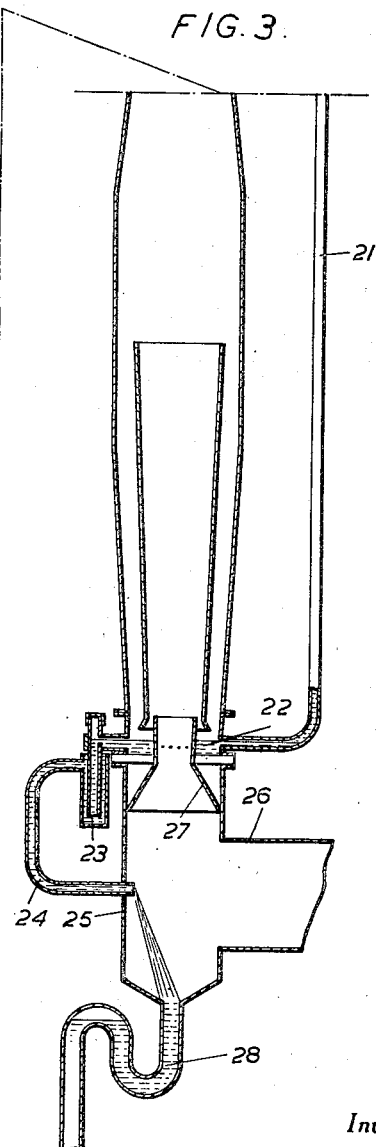

Jan. 26, 1954 B. S. ROBSON 2,667,340
GAS-LIQUID CONTACT APPARATUS
Filed Nov. 27, 1951 3 Sheets-Sheet 3

Inventor
B. S. Robson
By
Webb Mackey & Burden
Attorney

Patented Jan. 26, 1954

2,667,340

UNITED STATES PATENT OFFICE 2,667,340

GAS-LIQUID CONTACT APPARATUS

Briton Selby Robson, Huyton, England, assignor to British Insulated Callender's Cables Limited, London, England, a British company Application November 27, 1951, Serial No. 258,467

Claims priority, application Great Britain November 30, 1950

7 Claims. (Cl. 261—21)

This invention relates to apparatus for use in condensation, solution and other forms of interaction, physical or chemical, between liquid and gaseous matter, i. e., gas and/or vapour. One use of the apparatus which may be mentioned for purposes of illustration is the recovery of solvents from gaseous matter coming off from ovens of wire enamelling plant. This consists of a large volume of air (with other gases, perhaps), containing a small proportion of vapourised solvents such as cresylic acid and naphtha. The recovery is effected by condensation of the vapours in water and carrying off of the condensate mainly in suspension in water following by settling out or other separation. When applied to such a process the invention is concerned particularly with the apparatus by which the condensation and entraining of the solvents is carried out.

The apparatus in accordance with the invention comprises a vertical pipe for receiving gaseous matter which is fed in at the lower part and of which the residue after interaction with liquid is discharged from the upper part. This pipe contains one or more (preferably more) units each comprising a throat, i. e., a place where, by reduction of diameter, increased velocity of upward flow is obtained, the throat being formed by a tapering wall surmounted by a jet tube. Each unit also contains means for discharging the liquid into the stream of gaseous matter and an injector tube co-operating with the jet tube to cause the high velocity flow through the latter to draw in gaseous matter between them. Each unit also comprises a collector for liquid placed round the jet tube. Through this tube are small perforations serving for the passage of the collected liquid as jets into the interior of the throat.

When such a unit is in action the gaseous matter flowing upward is accelerated at the throat and thence passes upward as a strong stream into the injector tube and out from the top of that tube into the main pipe again. From this region some of the gaseous matter is drawn down between the injector tube and the main pipe and re-enters the injector tube as an annular stream between the jet tube and the lower end of the injector tube. Liquid is discharged into this stream at an appropriate point or points, as described later. It is entrained and carried by the upward moving gaseous matter and falls down between the injector tube and the main pipe and is collected at a region below the lower end of the injector tube so that it accumulates around the outside of the jet tube at the throat. When it has reached a sufficient height here it passes through openings in the wall of the jet tube and thereby becomes discharged into the rapidly moving stream passing up through this tube. It may thereby be re-circulated through the unit. When a sufficient volume has accumulated at the collecting place round the throat the surplus is drawn off, for instance, by flowing over a weir.

The initial supply of the liquid may come from a distributor placed above each unit so that it is discharged into the column of gas near the upper end of the unit and falls down therein to be diverted by the central rising stream into the space between the injector tube and the main pipe. Alternatively, the liquid may be sent in initially through holes in the jet tube at the region below that where the liquid is collected as it flows back. In some cases both forms of feeding in of the liquid may be used.

It will be realized that the speed of the gaseous matter through the throat must be sufficiently high to carry the liquid with it and prevent it from falling down below the throat to any excessive extent. It also must be sufficiently high to produce the injector action so as to re-circulate the gaseous matter and the liquid. It is found that a speed of about 600 metres per minute, in the throat will suffice for the performing of these functions. A higher speed may be used with a larger rate of driving power which may be beyond the capacity of a simple fan. A gas speed of about 120 metres per minute or even less may be used in the main tube outside the action of a unit.

Figure 4:
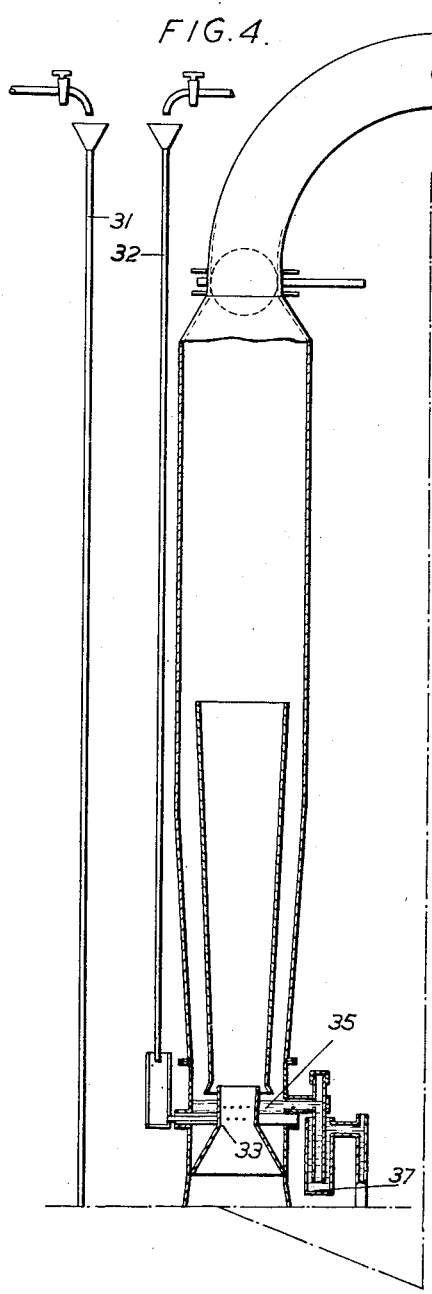
Figure 5:
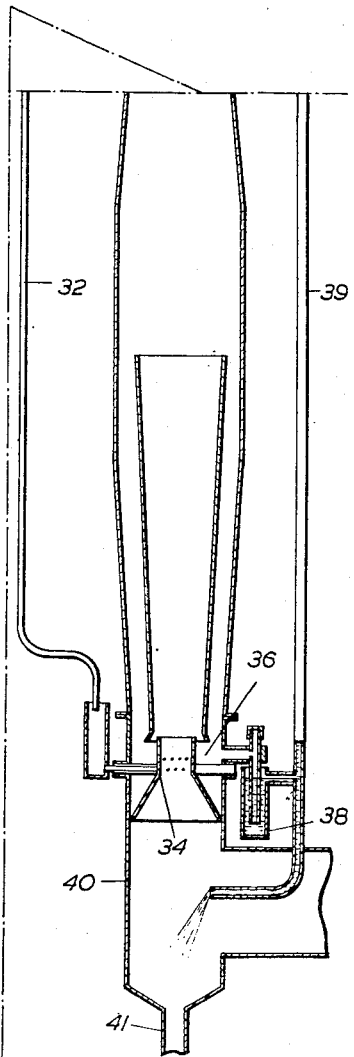

Figure 1 of the accompanying drawings is an elevation in cross-section of an example of a single unit in accordance with the invention which may be used alone or in combination with one or more further similar units. Figures 2 and 3 are diagrammatic drawings of the upper and lower units of a series of units having their liquid supply means connected in series and Figures 4 and 5 are diagrammatic drawings of the upper and lower units of a series of units with their liquid supply means in parallel.

Referring to Figure 1, the main gas pipe consists of a lower sheet metal part 1 connected to a flanged cylindrical part 2 on the upper end of which is mounted a further sheet metal part 3. A fan (not shown) or other propelling means is provided to act upon the body of gaseous material which is to pass up the main pipe. A valve may also be provided to control, to some extent, this flow.

Within the flanged part 2 of the gas pipe is mounted a jet tube 4, to the lower end of which is connected a cone 5 which bridges the space between the jet tube 4 and the gas pipe 1. Also bridging the space between the jet tube 4 and the flanged part 2 of the gas pipe, near to the lower end of the jet tube 4, is a plate 6 which forms with the gas pipe 2, and the jet tube 4 a collecting chamber for liquid which flows back down the gas pipe. Within the chamber thus formed there are a number of small holes 7 in the jet tube. Above the jet tube an injector tube 8 is mounted on vertical legs 8a supported on the plate 6 around the jet tube 4. The injector tube 8 extends upwards for a distance equal to several diameters of the gas pipe, both the injector tube 8 and the part 3 of the gas pipe increasing slightly in diameter upwards. At the inner edge of the annular plate 6 is formed a circular passage 9 which communicates with the inside of the jet tube 4 through a number of small holes 10 in the wall of the jet tube. This passage is fed with liquid through a supply pipe 11 which in turn is fed with liquid through a vertical pipe 12 and a chamber 13.

Part of the liquid collecting in the chamber formed by the annular plate 6, jet tube 4 and gas pipe 2 flows back into the jet tube through the holes 7, the remainder of this liquid flows over a weir formed by an outlet tube 14 in the part 2. The level of this weir can be adjusted by raising or lowering a vertical pipe 15 which is held in its adjusted position by a stud 16. In the drawing, the pipe 15 is arranged in a position in which an aperture 17 in its wall is so located that its lower edge coincides with the upper surface of the lower wall of the pipe 14. The effective height of the weir can be raised by raising the pipe 15 to bring the lower edge of the aperture 17 above the upper surface of the lower wall of the pipe 14. Liquid overflowing from the collecting chamber through the pipe 15 can be led away for disposal or fed back into another unit.

As previously indicated, it is preferred to use several of these units. They may be place one above the other in the main tube so as to act on the gaseous matter in succession. With such an arrangement liquid fed initially into each unit may either go through the several units in series or in parallel. In the former case the outflow from the collecting chamber of one unit, for instance the top unit, passes to the place of inflow for the initial liquid of the next unit and so on. Where the gas comes in hot and the liquid comes in cold initially the series arrangement of flow of liquid from the top downward will provide that there shall be a substantial difference of temperature between liquid and gas at each stage. The gain of temperature at each stage can be controlled by the adjustment of the height of the weir leading to the outlet pipe. The series arrangement is useful where there is reason to keep down the quantity of liquid used in the plant, for instance on account of initial cost or availability or because of an advantage in handling, or disposing of, or treating for re-use. For parallel connection fresh liquid from an external source is supplied simultaneously to each of the units and the collected liquid is drawn off from all of them to a storage place or other place of further treatment.

In many cases some liquid will fall to the bottom of the main pipe so that it will be necessary to insert a drain pipe there. The lower end of the pipe, or a downward sloping passage leading the gaseous matter to it, may be used for a preliminary treatment by injecting liquid, either fresh or from one or more of the units, into this region, drawing off the liquid from the bottom of the main pipe.

Referring to Figures 2 and 3, of the drawings, Figure 2 shows diagrammatically a unit similar to that described with reference to Figure 1, except that the liquid inlet takes the form of a sprinkler 18 arranged above the injector tube. Liquid overflowing from the collecting chamber 19 passes through a trap 20 and pipe 21, into a unit arranged in series with that shown in Figure 2 and below it. This may for example be the unit shown in Figure 3 if only two units are used.

Referring to Figure 3, liquid flowing through the pipe 21 or the equivalent pipe from another unit passes into the collecting chamber 22 of the unit. Liquid flowing over the weir in the collecting chamber 22 passes through a trap 23 and pipe 24 back into the main gas pipe 25. The gas enters the main gas pipe 25 through a pipe 26. Liquid passing through the pipe 24 and any liquid passing downwards through the jet tube 27 passes through a drain pipe 28 into a settling tank.

Referring again to Figure 2 the gas treated in the two (or more) units passes from the uppermost unit through the gas pipe 29, to the atmosphere. The velocity of the gas through the units is controlled by a damper 30, its speed of flow through the units may, and usually will, be increased by a suction fan arranged in the pipe 29.

Figures 4 and 5 show two units connected in series as far as the gas flow is concerned, but in parallel for the supply of liquid. Fresh liquid passes into each of the two units independently through pipes 31 and 32. Both units are provided with two sets of liquid inlet holes in their jet tubes 33 and 34 in a similar manner to the unit described with reference to Figure 1. Liquid overflowing from the collecting chambers 35 and 36 of the two units passes through traps 37 and 38 and a pipe 39 back into the main gas pipe 40, where it collects in a drain pipe 41 and is led away to settling tanks. Further units may be interposed between the units shown in Figures 4 and 5.

The same system of liquid supply can be used when a number of units are connected in parallel for the flow of gas, that is connected in such a way that the main gas stream is divided and part of it flows through each unit either directly into the atmosphere or into a manifold outlet pipe.

A suction fan 42 for increasing the velocity of the gas through the pipe is shown in Figure 2.

As an example of appropriate proportions for a particular case the following is given; it applies to the example mentioned previously of the recovery of solvents from the gaseous matter coming off from the ovens of a wire enamelling plant. The main pipe has a diameter of 23 cms. in the region of the throat and of 30 cms. near the upper end of the injector tube. The jet tube is 8.9 cms. internal diameter and the injector is 13.3 cms. diameter at its lower end and 18.41 cms. at its upper end and 56 cms. long. Where a sprinkler spraying liquid into the upper part of the unit is employed this is placed at about 2.4 metres above the throat.

What I claim as my invention is:

1. Apparatus for causing interaction between gaseous matter and a liquid comprising a vertical pipe, means for feeding gaseous matter upwards through said pipe, in said pipe a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, liquid supply means in said pipe for discharging liquid into said gaseous matter, a liquid collecting chamber arranged around said jet tube and having as one of its walls the part of said jet tube formed with said perforations and means for drawing off surplus liquid from said collecting chamber.

2. Apparatus for causing interaction between gaseous matter and a liquid comprising a vertical pipe, means for feeding gaseous matter upwards through said pipe, in said pipe a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, liquid supply means in said pipe for discharging liquid into said gaseous matter, a liquid collecting chamber arranged around said jet tube and having as one of its walls the part of said jet tube formed with said perforations, an adjustable weir in said collecting chamber and means for leading away from said chamber liquid overflowing from said weir.

3. Apparatus for causing interaction between gaseous matter and a liquid comprising a vertical pipe, means for feeding gaseous matter upwards through said pipe, in said pipe a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, a sprinkler in said pipe for discharging liquid into said gaseous matter, a liquid collecting chamber arranged around said jet tube and having as one of its walls the part of said jet tube formed with said perforations and means for drawing off surplus liquid from said collecting chamber.

4. Apparatus for causing interaction between gaseous matter and a liquid comprising a vertical pipe, means for feeding gaseous matter upwards through said pipe, in said pipe a jet tube formed with two sets of small perforations, a wall extending completely around the lower end of said jet tube and connecting said lower end with the wall of said pipe below said lower end, an injector tube extending upwards above and spaced from the jet tube to draw in gaseous matter between said tubes, liquid supply means for feeding liquid from outside said pipe through one of said sets of perforations in said jet tube into said jet tube, a liquid collecting chamber arranged around said jet tube and having as one of its walls the part of said jet tube formed with the other set of perforations and means for drawing off surplus liquid from said collecting chamber.

5. Apparatus for causing interaction between gaseous matter and a liquid comprising a vertical pipe, means for feeding gaseous matter upwards through said pipe, in said pipe at least two units arranged one above the other and each comprising a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, liquid supply means in said pipe for discharging liquid into said gaseous matter, a liquid collecting chamber arranged around said jet tube and having as one of its walls the part of said jet tube formed with said perforations and means for drawing off surplus liquid from said collecting chamber, means for feeding the liquid drawn off from the collecting chamber of each of said units except the lowest through the liquid supply means of the next unit below, means for feeding fresh liquid to the liquid supply means of the uppermost unit and means for leading away the surplus liquid drawn off from said lowest unit.

6. Apparatus for causing interaction between gaseous matter and a liquid comprising a vertical pipe, a suction fan for drawing at a controlled rate gaseous matter upwards through said pipe, in said pipe a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, liquid supply means in said pipe for discharging liquid into said gaseous matter, a liquid collecting chamber arranged around said jet tube and having as one of its walls the part of said jet tube formed with said perforations and means for drawing off surplus liquid from said collecting chamber.

7. Apparatus for causing interaction between gaseous matter and a liquid comprising a vertical pipe, means for feeding gaseous matter upwards through said pipe, in said pipe at least two units arranged one above the other and each comprising a jet tube formed with a number of small perforations, a wall extending completely around the lower end of said jet tube and connecting said lower end with the wall of said pipe below said lower end, an injector tube extending upwards above and spaced from the jet tube to draw in gaseous matter between said tubes, a liquid collecting chamber arranged around said jet tube and having as one of its walls the part of said jet tube formed with said perforations and means for drawing off surplus liquid from said collecting chamber, means for feeding the liquid drawn off from the collecting chamber of each of said units except the lowest into the collecting chamber of the next unit below, means for feeding fresh liquid to the liquid supply means of the uppermost unit and means for leading away the surplus liquid drawn off from said lowest unit.

BRITON SELBY ROBSON.

References Cited in the file of this patent

UNITED STATES PATENTS

| Number | Name | Date |
|---|---|---|
| 679,666 | Clawson | July 30, 1901 |
| 917,561 | Double | Apr. 6, 1909 |
| 970,520 | Lombard | Sept. 20, 1910 |
| 1,134,365 | Barnes | Apr. 6, 1915 |
| 2,150,452 | Morse | Mar. 14, 1939 |